US009984645B2

(12) United States Patent
Yamamoto

(10) Patent No.: US 9,984,645 B2
(45) Date of Patent: May 29, 2018

(54) DISPLAY DEVICE AND CONTROL METHOD

(71) Applicant: Japan Display Inc., Minato-ku (JP)

(72) Inventor: Tetsuya Yamamoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days. days.

(21) Appl. No.: 15/013,704

(22) Filed: Feb. 2, 2016

(65) Prior Publication Data

US 2016/0240163 A1 Aug. 18, 2016

(30) Foreign Application Priority Data

Feb. 16, 2015 (JP) .................................. 2015-027587

(51) Int. Cl.
*G06F 3/041* (2006.01)
*G09G 3/36* (2006.01)

(52) U.S. Cl.
CPC ......... *G09G 3/3696* (2013.01); *G06F 3/0412* (2013.01); *G09G 3/3648* (2013.01); *G09G 2330/02* (2013.01); *G09G 2330/021* (2013.01)

(58) Field of Classification Search
CPC ....... G06F 3/044; G06F 3/0412; G06F 3/0416
USPC ................................................. 345/173, 174
See application file for complete search history.

(56) References Cited

U.S. PATENT DOCUMENTS

2003/0227452 A1* 12/2003 Hartular ............... H02J 7/0063
345/211
2013/0113735 A1 5/2013 Takeuchi et al.
2015/0161954 A1* 6/2015 Tokita .................. G06F 3/0412
345/174

FOREIGN PATENT DOCUMENTS

JP 2013-101427 5/2013

* cited by examiner

*Primary Examiner* — Calvin C Ma
(74) *Attorney, Agent, or Firm* — Oblon, McClelland, Maier & Neustadt, L.L.P.

(57) ABSTRACT

According to one embodiment, a display device includes a display and a driver. The display is configured to display an image. The driver is configured to execute driving for displaying the image on the display in a display period to display the image, and execute driving different from the driving for displaying the image on the display, in a non-display period subsequent to the display period.

10 Claims, 15 Drawing Sheets

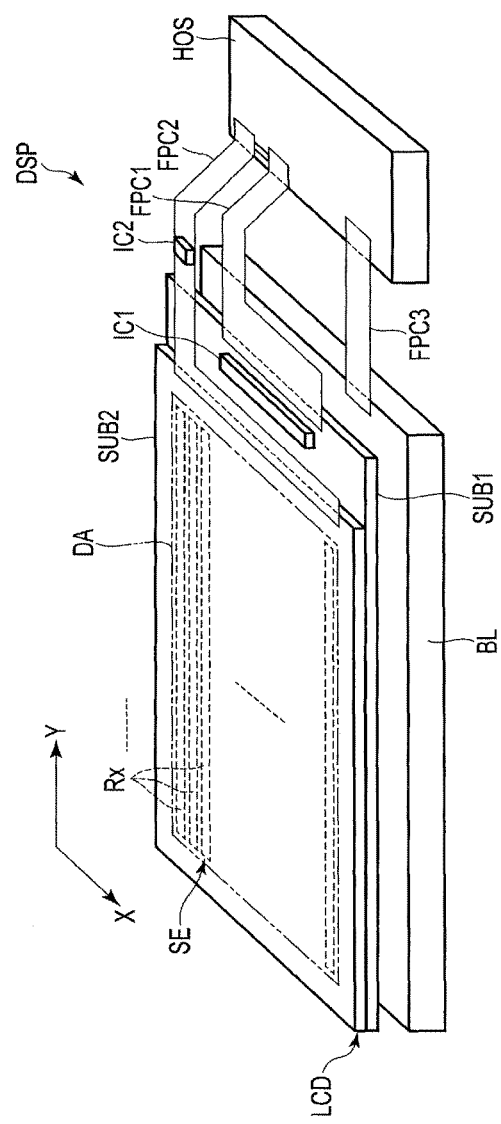
F I G. 1

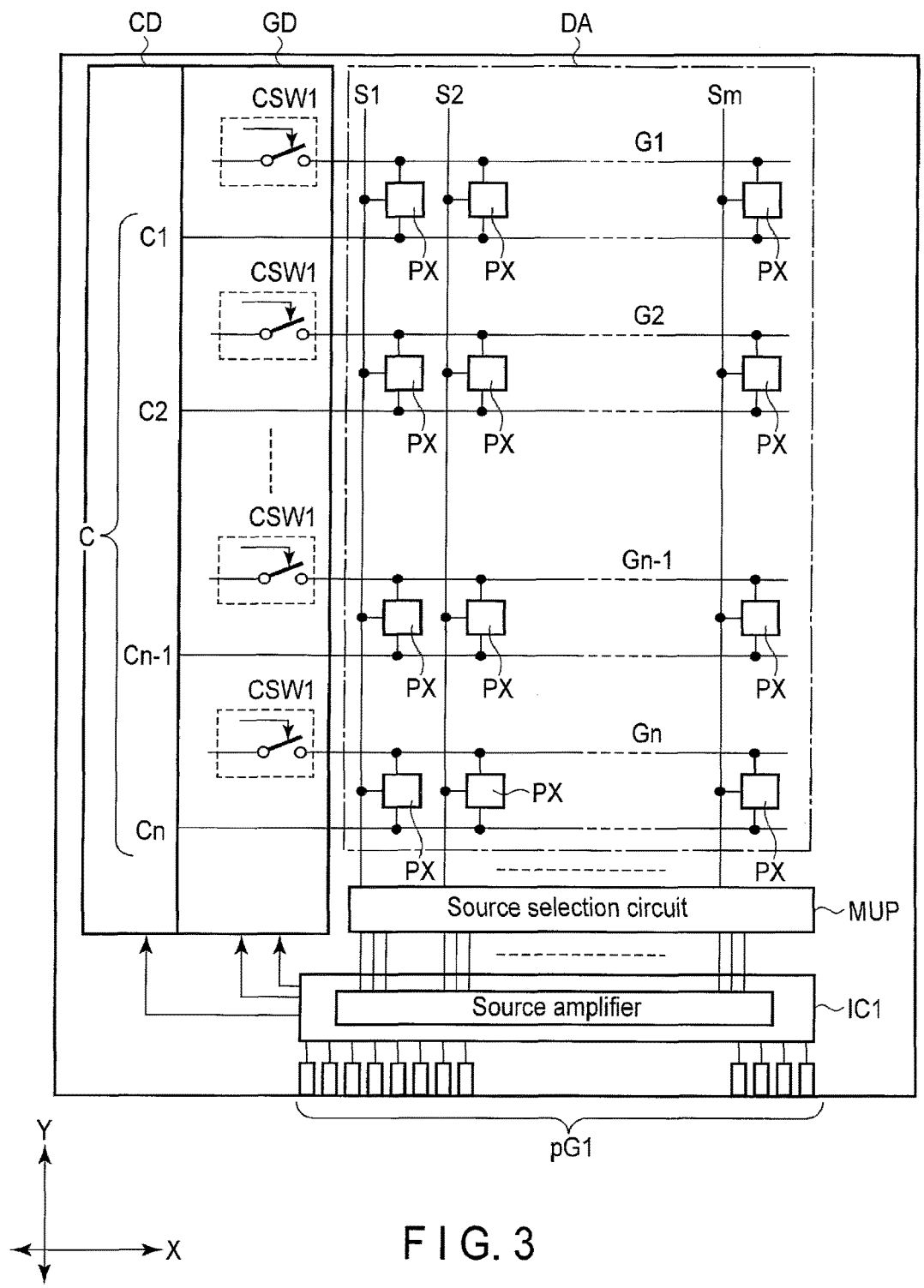
F I G. 3

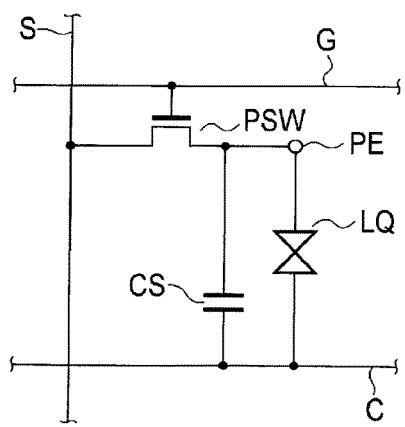
F I G. 4
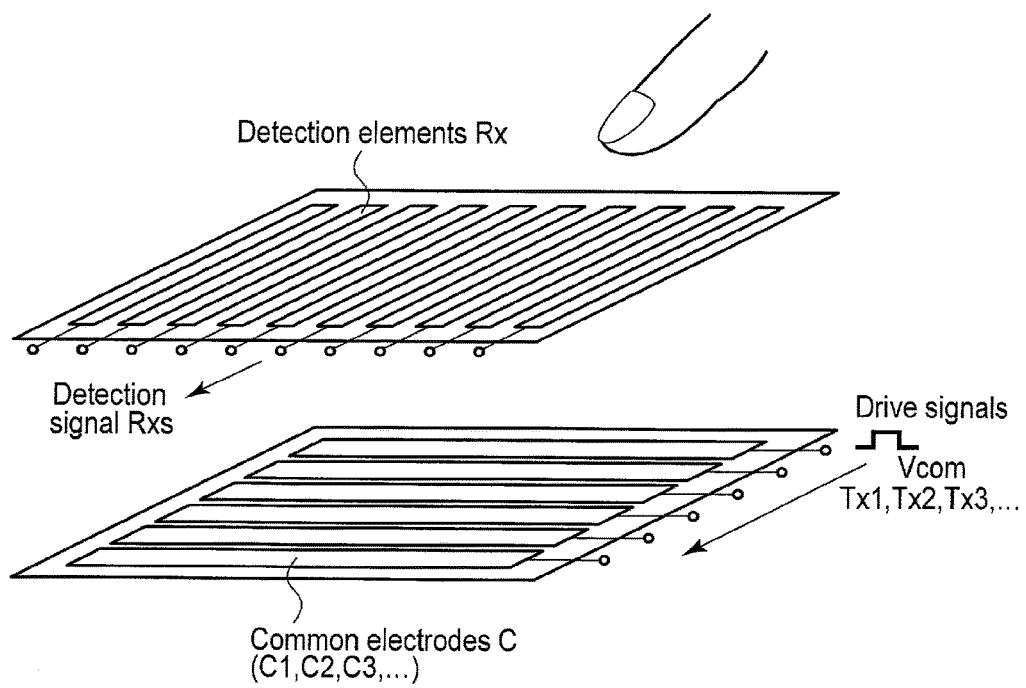
F I G. 5A

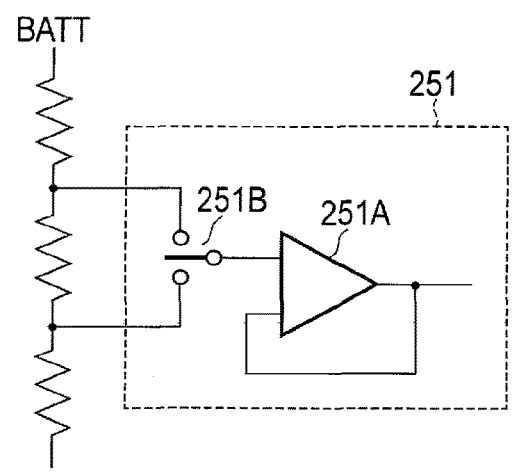
F I G. 7A
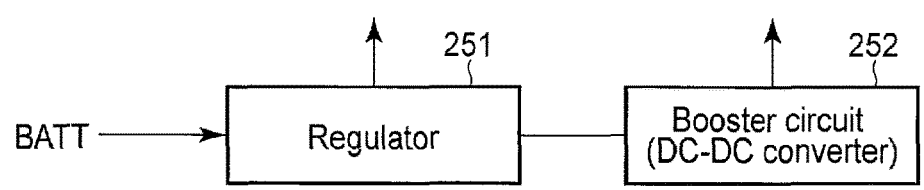
F I G. 7B

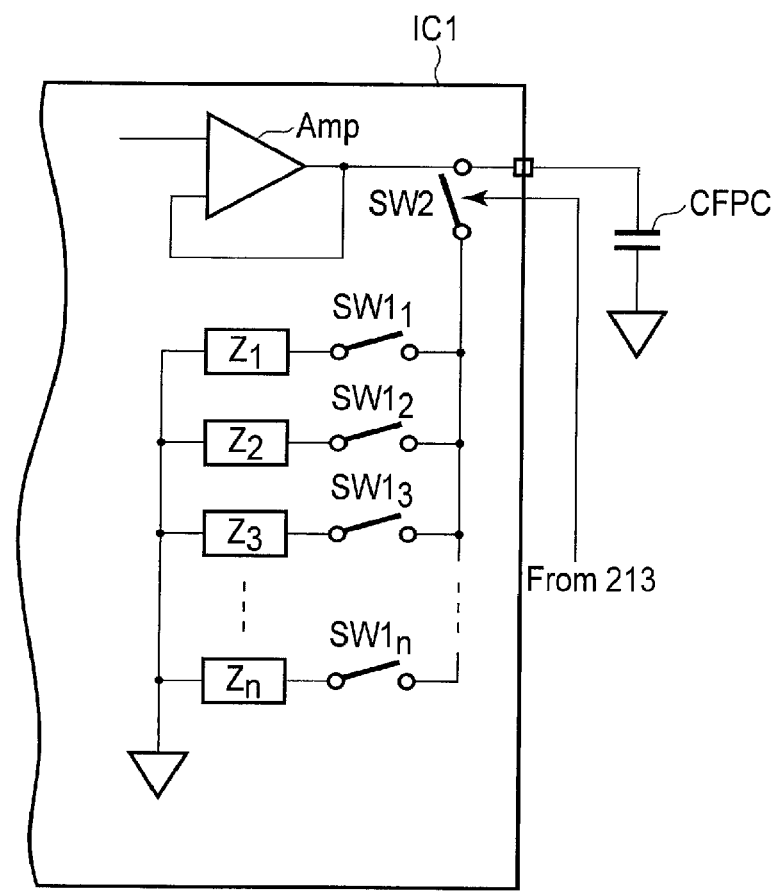
F I G. 8

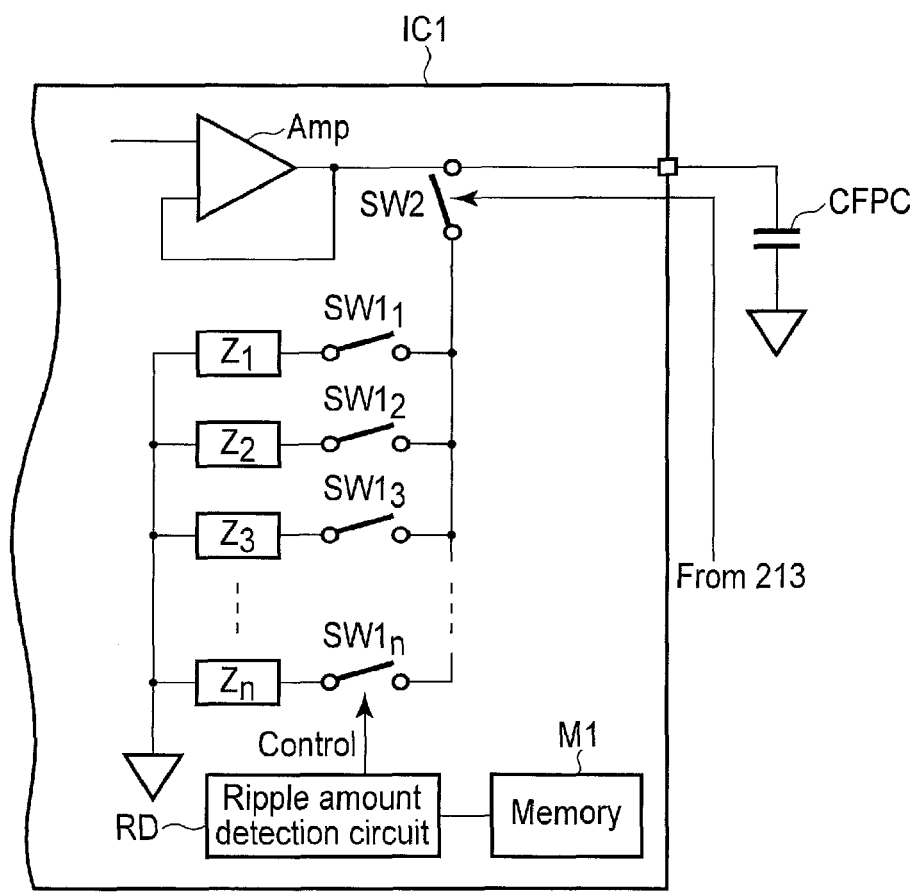
F I G. 10

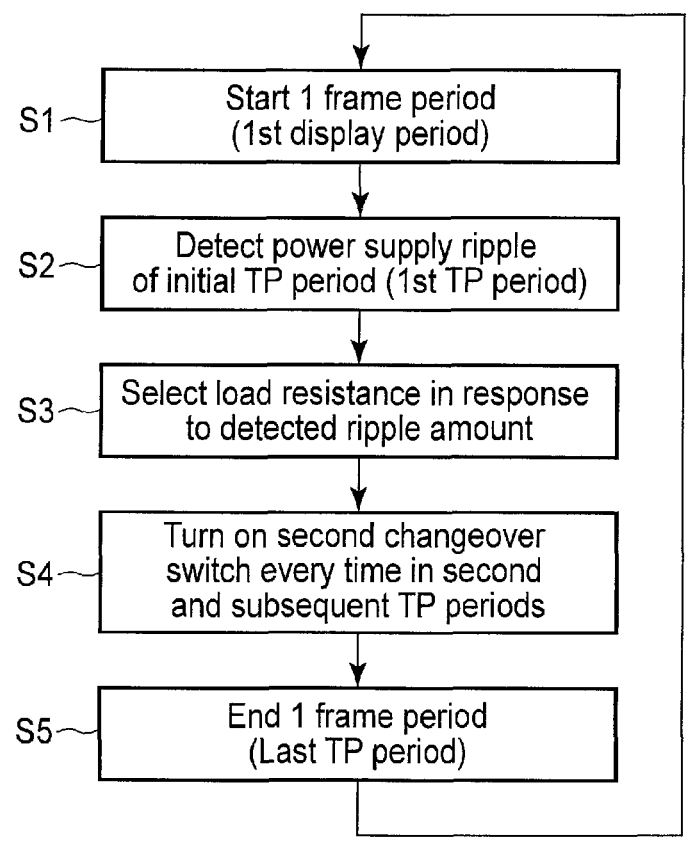
F I G. 11

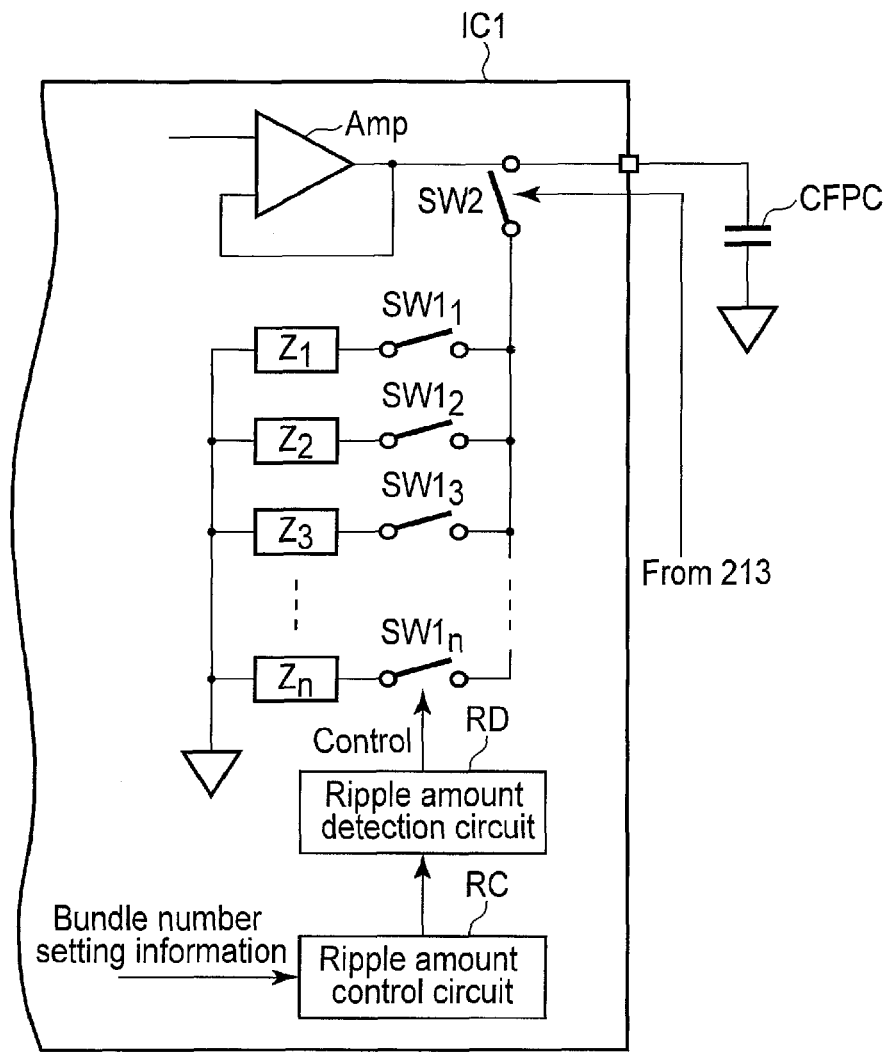
F I G. 13

DISPLAY DEVICE AND CONTROL METHOD

CROSS-REFERENCE TO RELATED APPLICATIONS

This application is based upon and claims the benefit of priority from Japanese Patent Application No. 2015-027587, filed Feb. 16, 2015, the entire contents of which are incorporated herein by reference.

FIELD

Embodiments described herein relate generally to a display device and a control method.

BACKGROUND

In general, mobile terminals (for example, smartphones, PDAs, tablet computers and the like) are provided with a display device such as a liquid crystal display device or an organic EL display device. Recently, the display device is equipped with an additional function such as a touch sensor or the like.

Incidentally, for example, a display device which enables the touch sensor to operate in a blank period of liquid crystal drive is well known as a liquid crystal display device having a touch sensor function built in a display panel. Since panel drive load is varied in a display drive period (hereinafter called a display period) of the liquid crystal and a sensing operation period (hereinafter called a non-display period) of the touch sensor, load variation often occurs cyclically on the display panel when the display period and a touch period are cyclically set. At this time, a booster circuit and a regulator for the liquid crystal drive cannot follow the load variation and ripple (noise) occurs in a power supply voltage. The ripple has a risk of causing various disadvantages to the liquid crystal display device.

BRIEF DESCRIPTION OF THE DRAWINGS

FIG. 1 is an illustration showing overall configuration blocks of a mobile terminal of one of the embodiments.

FIG. 3 is a diagram schematically showing an equivalent circuit on a first substrate of a liquid crystal display panel.

FIG. 4 is a diagram showing an equivalent circuit of a pixel PX shown in FIG. 3.

FIG. 5A is an illustration showing a basic configuration example of a mutual detection type touch sensor SE.

FIG. 7A is a diagram showing an example of configuration of a power supply module in the liquid crystal driver IC1 shown in FIG. 6.

FIG. 7B is a diagram showing an example of configuration of a power supply module in the liquid crystal driver IC1 shown in FIG. 6.

FIG. 8 is a diagram showing an example of a circuit configuration of the load resistance circuit LR of the first embodiment.

FIG. 10 is a diagram showing an example of a circuit configuration of the load resistance circuit LR of the second embodiment.

FIG. 11 is a flowchart showing an example of an operation of the load resistance circuit LR shown in FIG. 10.

FIG. 13 is a diagram showing an example of a circuit configuration of the load resistance circuit LR of the third embodiment.

DETAILED DESCRIPTION

Figure 2:
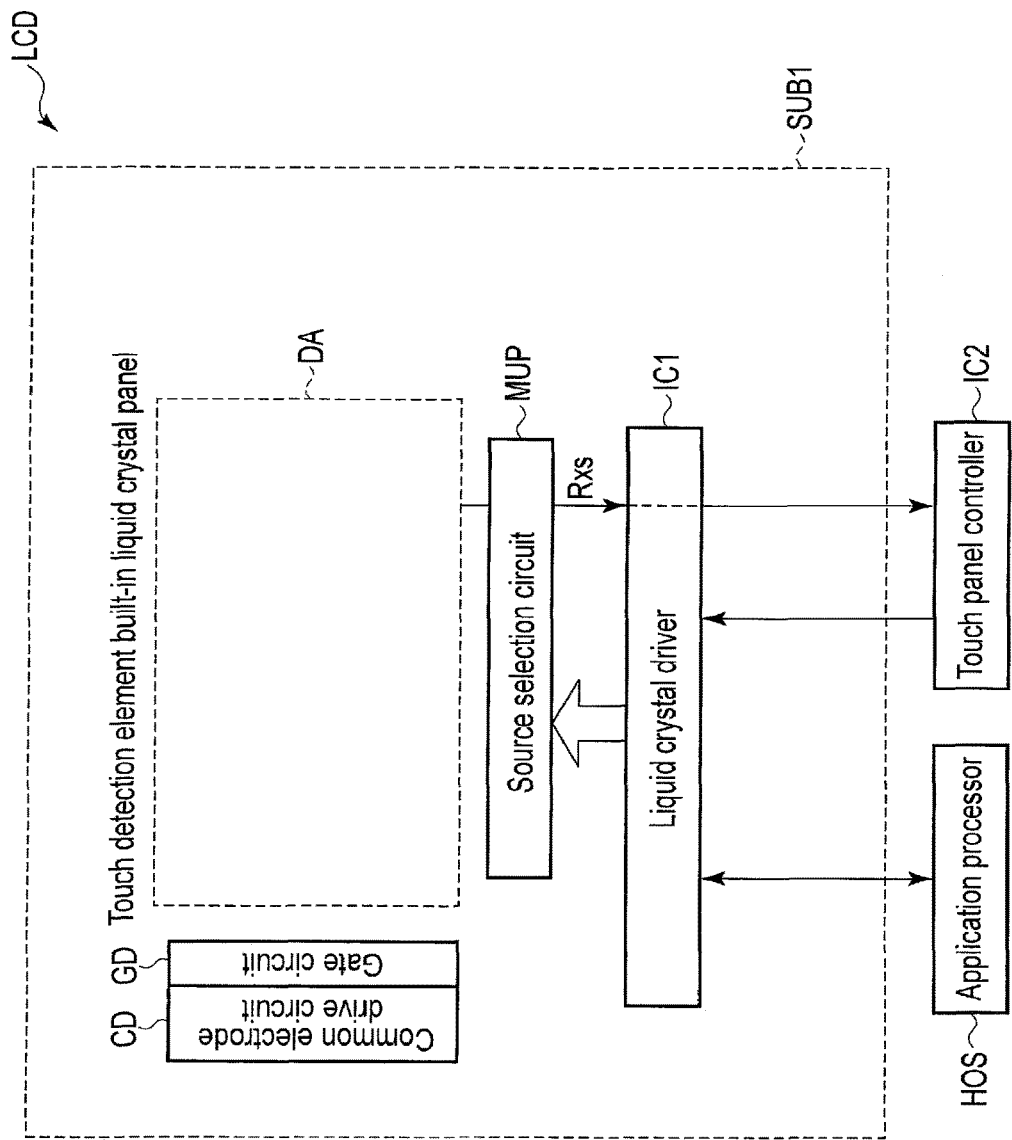
FIG. 2 is a diagram showing major circuit blocks as parts of FIG. 1.

In general, according to one embodiment, a display device includes a display and a driver. The display is configured to display an image. The driver is configured to execute driving for displaying the image on the display in a display period to display the image, and execute driving different from the driving for displaying the image on the display, in a non-display period subsequent to the display period. The driver includes a power supply module, a load module, a switch and a first controller. The power supply module is configured to supply power to the display. The load module is configured to form load supplied to the power supply module. The switch is configured to make connection between an output line of the power supply module and the load module. The first controller is configured to control the switch, the first controller executing control of making connection between the output line of the power supply module and the load module in the non-display period.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, etc., of each portion as compared with an actual aspect, but they are mere examples and do not restrict the interpretation of the invention. In the drawings, reference numerals of the same or similar elements arranged sequentially are often omitted. In the present specification and drawings, elements like or similar to those in the already described drawings may be denoted by similar reference numbers and their detailed descriptions may be arbitrarily omitted.

First Embodiment

FIG. 1 is an illustration showing overall configuration blocks in a display device of one of the embodiments. In FIG. 1, a touch-sensor-integrated liquid crystal display panel LCD includes a first substrate SUB1, a second substrate SUB2 opposed to the first substrate SUB1, and a liquid crystal layer provided between the first substrate SUB1 and the second substrate SUB2. The first substrate SUB1 may be called an array substrate and the second substrate SUB2 may be called a counter-substrate. A liquid crystal driver IC1 driving the liquid crystal display panel LCD is mounted on the first substrate SUB1. The liquid crystal driver IC1 may be called as a first IC chip or a drive circuit.

The liquid crystal display panel LCD integrally includes, for example, a touch sensor SE of a capacity variation detection type in a display area DA which may be called an active area. The touch sensor SE is composed of a common electrode C to be explained later, which is provided on the first substrate SUB1, and a touch detection electrode Rx which is provided on a second substrate SUB2 and which may be called a touch detection element. The touch sensor SE of this type is called an in-cell touch sensor. The operation principle of the in-cell touch sensor SE will be explained later. The touch detection element Rx can be formed of, for example, Indium-Tin-Oxide (ITO) or a thin metal wire having a width in a range from 2 to 5 μm so as not to affect the liquid crystal display.

The touch sensor SE is driven by a drive signal from the liquid crystal driver IC1. In addition, an output signal of touch sensor SE is detected by a touch panel controller IC2 which may be called a second IC chip or a sensor circuit.

An application processor HOS which may be called a first controller is also provided. The application processor HOS is connected to the liquid crystal display panel LCD via a flexible printed-circuit board FPC1 and the liquid crystal driver IC1. The application processor HOS is connected to the touch sensor SE via a flexible printed-circuit board FPC2 and the touch panel controller 102. The liquid crystal driver IC1 and the touch panel controller 102 are electrically connected with each other and cooperate with respect to operation timing. The liquid crystal driver IC1 and the touch panel controller 102 may be configured in the same chip.

A backlight unit BL configured to illuminate the liquid crystal display panel LCD is arranged under the second substrate SUB2. A flexible printed-circuit board FPC3 connects the backlight unit BL and the application processor HOS. Various types of units are applicable as the backlight unit BL, and examples of the light source include a light source using a light-emitting diode (LED), a light source using a cold-cathode tube (CCFL) and the like.

FIG. 2 specifically illustrates major circuit blocks as parts of FIG. 1. A portion surrounded by a broken line in FIG. 1 corresponds to the first substrate SUB1. A gate drive circuit GD is formed in, for example, a left area of a non-display area of the first substrate SUB1. The gate drive circuit GD drives gate lines G (G1 to Gn), which are shown in FIG. 3. In addition, a common electrode drive circuit CD is provided together with the gate drive circuit GD. The common electrode drive circuit CD drives common electrodes C (C1 to Cn), which are shown in FIG. 3. In addition, a source selection circuit MUP, which is often called a multiplexer, is provided in a non-display area on a lower side of the first substrate SUB1.

The liquid crystal driver IC1 controls the gate circuit GD, the common electrode drive circuit CD and the like. In addition, the liquid crystal driver IC1 can write a pixel signal to a pixel, which may be called a display element, in the display area DA via the source selection circuit MUP.

The touch panel controller 102 processes a touch detection signal Rxs obtained from the touch detection element Rx. Coordinate data of a contact position of a detected object such as the user's finger on the display surface of the liquid crystal display panel LCD can be thereby obtained. The liquid crystal driver IC1 executes intercommunication with the application processor HOS for data request and reception and the like.

The application processor HOS supplies video data, a command, a synchronization signal and the like to the liquid crystal driver IC1.

FIG. 3 schematically shows one of equivalent circuits on the first substrate SUB1 of the liquid crystal display panel LCD. The liquid crystal display panel LCD includes the display area DA on which an image is displayed. On the first substrate SUB1, the source selection circuit MUP, the gate drive circuit GD, the common electrode drive circuit CD, and an outer lead bonding pad group (hereinafter called an OLB pad group) pG1 are formed at positions corresponding to the non-display area.

The liquid crystal driver IC1 is connected to the source selection circuit MUP, the gate drive circuit GD, the common electrode drive circuit CD and the OLB pad group pG1. The liquid crystal driver IC1 and the gate drive circuit GD are connected with each other by a control line which outputs a panel control signal, though not shown entirely. The liquid crystal driver IC1 can supply a control signal to a control switching element CSW1 via the control line.

The first substrate SUB1 includes a plurality of gate lines G (G1 to Gn) extending along a first direction X and a plurality of source lines S (S1 to Sm) extending along a second direction Y intersecting the first direction X, in the display area DA. In addition, the gate lines G (G1 to Gn) are spaced apart at regular intervals and arranged in the second direction Y. The source lines S (S1 to Sm) are also spaced apart at regular intervals and arranged in the first direction X.

In addition, in the display area DA, a plurality of pixels PX are arrayed in a matrix, between the first substrate SUB1 and a second substrate (not shown), and arranged near respective intersections of the gate lines G and the source lines S. The pixels PX are therefore arrayed in a matrix of m×n in the first direction X and the second direction Y where m and n are positive integers. Furthermore, the common electrodes C (C1 . . . Cn) are also formed along the first direction X. The common electrodes C (C1 . . . Cn) are used as the electrodes which drive the pixels PX and also used as the electrodes which drive the touch sensor SE as explained later.

The gate lines G extend along the first direction X, are drawn to the outside of the display area DA, and are connected to the gate drive circuit GD. The gate drive circuit GD includes a plurality of control switching elements CSW1 and the gate lines G (G1, D2, . . . , Gn) are connected to the control switching elements CSW1 in a one-to-one relationship.

The source lines S extend along the second direction Y and cross the gate lines G (G1, G2, . . . , Gn) as viewed in a plane. The source lines S are spaced apart at regular intervals and arranged in the first direction X. The source lines S (S1 to Sm) are drawn to the outside of the display area DA and connected to the source selection circuit MUP.

The common electrodes C (C1, C2, . . . , Cn) are formed in a stripe shape, extend in the first direction X, and are spaced apart with intervals and arranged in the second direction Y. The common electrodes C (C1, C2, . . . , Cn) thereby extend along the gate lines G (G1, D2, . . . Gn), and intersect the source lines S (S1 to Sm) as viewed in a plane.

The common electrodes C may be, for example, divisional electrodes in which every plural (for example, three) electrodes are bundled. For example, the common electrodes C (C1 to Cn) are constituted as n/3 divisional electrodes (C1/3 to Cn/3).

The common electrodes C are drawn to the outside of the display area DA and connected to the common electrode drive circuit CD. The gate lines G, the source lines S and the common electrodes C may not extend linearly as shown in the figure, and may be bent in part.

The gate drive circuit GD includes n control switching elements CSW1. Each of n control switching elements CSW1 can be selectively turned on or off and can control permission or prohibition writing of a pixel signal to the corresponding pixel PX.

The pixel signal is written to a plurality of pixels PX connected to the selected gate line, simultaneously, via the source selection circuit MUP.

FIG. 4 is an equivalent circuit diagram showing one of the pixels PX shown in FIG. 3. The pixel PX includes a pixel switching element PSW, a transparent pixel electrode PE, a transparent common electrode C, and the like. The pixel switching element PSW is formed of, for example, a thin film transistor (TFT). The pixel switching element PSW is electrically connected to the gate line G and the source line S. The pixel switching element PSW may be a top-gate TFT or a bottom-gate TFT. In addition, a semiconductor layer of the pixel switching element PSW is formed of, for example, polysilicon, but may be formed of amorphous silicon.

The pixel electrode PE is electrically connected to the pixel switching element PSW. The pixel electrode PE is opposed to the common electrode C via the insulating film. The common electrode C, the insulating film and the pixel electrode PE form a storage capacitor CS. When the pixel switching element PSW is turned on by the control signal from the gate line G, the pixel signal output from the source selection circuit MUP to the source line S is written to the storage capacitor CS and held. The aligned state of the liquid crystal molecules of the liquid crystal LQ is changed in accordance with the voltage generated in the storage capacitor CS, and modulation of the backlight transmitting the liquid crystal is implemented. Only one pixel PX is illustrated in FIG. 4 but, when one of the control switching elements CSW1 shown in FIG. 3 is turned on, the pixel switching elements PSW of the pixels connected to the corresponding gate line G are turned on simultaneously. The pixel signal from the source line S connected to each of the pixel switching elements PSW is written to the storage capacitor CS of the corresponding pixel PX.

Figure 5B:
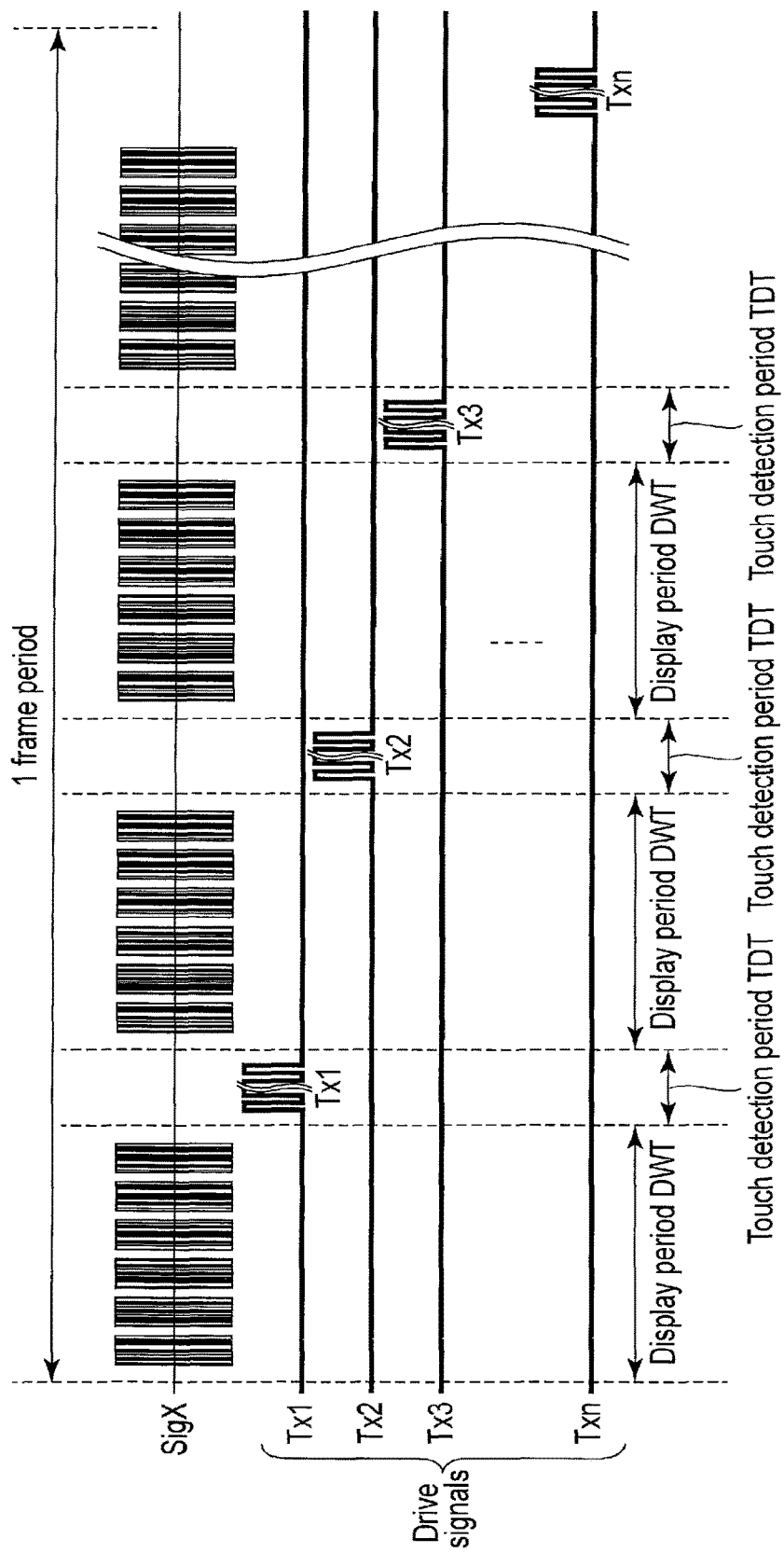
FIG. 5B is a timing chart showing a relationship between drive timing of the touch sensor SE in FIG. 5A and the display period, in the liquid crystal display panel.

FIG. 5A and FIG. 5B are illustrations for explanation of a basic operation of the in-cell touch sensor SE.

FIG. 5A shows a mutual (mutual capacitance) detection touch sensor SE. A plurality of touch detection elements Rx are formed in a stripe shape in the second direction Y, on the second substrate SUB2, and the common electrodes C (C1, C2, C3, . . . ) are formed on the first substrate SUB1. The plurality of touch detection elements Rx and the common electrodes C (C1, C2, C3, . . . ) intersect each other.

The common electrodes C1, C2, C3, . . . are sequentially driven in a plurality of touch detection periods TDT to be explained later. For example, the common electrode C1 is driven by a drive signal Tx1 in the first touch detection period TDT, the common electrode C2 is driven by a drive signal Tx2 in the second touch detection period TDT, and the common electrode C3 is driven by a drive signal Tx3 in the third touch detection period TDT. The drive signals may be called sequentially higher frequency pulse drive signals or scanning signals.

In the scanning period, from, for example, the touch detection element Rx with which a detected object such as a finger is in touch, a detection signal Rxs of a lower level compared with the outputs from the other touch detection elements Rx is detected. This is because, besides a first capacitance generated between the touch detection element Rx with which the finger is in touch and the common electrode, a second capacitance is also generated between the touch detection element Rx and the finger. The second capacitance by the finger is not generated between the other touch detection elements Rx and the common electrodes.

The first capacitance alone is generated between the other touch detection elements Rx and the common electrodes.

The coordinate position of the finger can be determined based on the drive timing of the common electrodes C1, C2, C3, . . . and the position of the touch detection element Rx which outputs the lower-level detection signal Rxs.

FIG. 5B shows a timing chart formed when the common electrodes C (C1, C2, C3, . . . ) are driven by the drive signals Tx1, Tx2, Tx3, . . . . As shown in FIG. 5B, one frame period is divided into a plurality of display periods DWT (including periods of writing pixel signal SigX), and a touch detection period TDT is set between display periods DWT (and may also be called a non-display period TDT). In the touch detection periods TDT, the common electrodes C (C1, C2, C3, . . . ) are driven by the drive signals Tx1, Tx2, Tx3, . . . .

The touch detection period is disclosed as the non-display period in the present embodiment. The non-display period includes not only the touch detection period, but also a period of resetting a state of inputting a signal to each pixel in an interval between the display periods, other than the touch detection period.

If the common electrodes C (C1, C2, C3, . . . ) are driven by the drive signals Tx1, Tx2, Tx3, . . . and the user's finger or the like is close to the display surface, the low-level detection signal Rxs is output from the touch detection signal Rx corresponding to the finger position. As shown in FIG. 5B, the display periods DWT and the touch detection periods TDT are dispersed at a plurality of positions in one frame. The basic configuration and operation of the in-cell touch sensor SE have been explained above.

In the above explanations, the common electrodes C (C1, C2, C3, . . . ) are sequentially driven by the corresponding drive signals Tx1, Tx2, Tx3, . . . , respectively. However, the driving method is not limited to this, but one drive signal, for example, Tx1 may simultaneously drive two or three common electrodes and Tx2 may simultaneously drive next two or three common electrodes. Alternatively, one drive signal, for example, Tx1 may simultaneously drive all the common electrodes in the touch detection periods.

Next, an example of the block configuration in the liquid crystal driver IC 1 which is an IC chip will be explained in detail with reference to FIG. 6.

Figure 6:
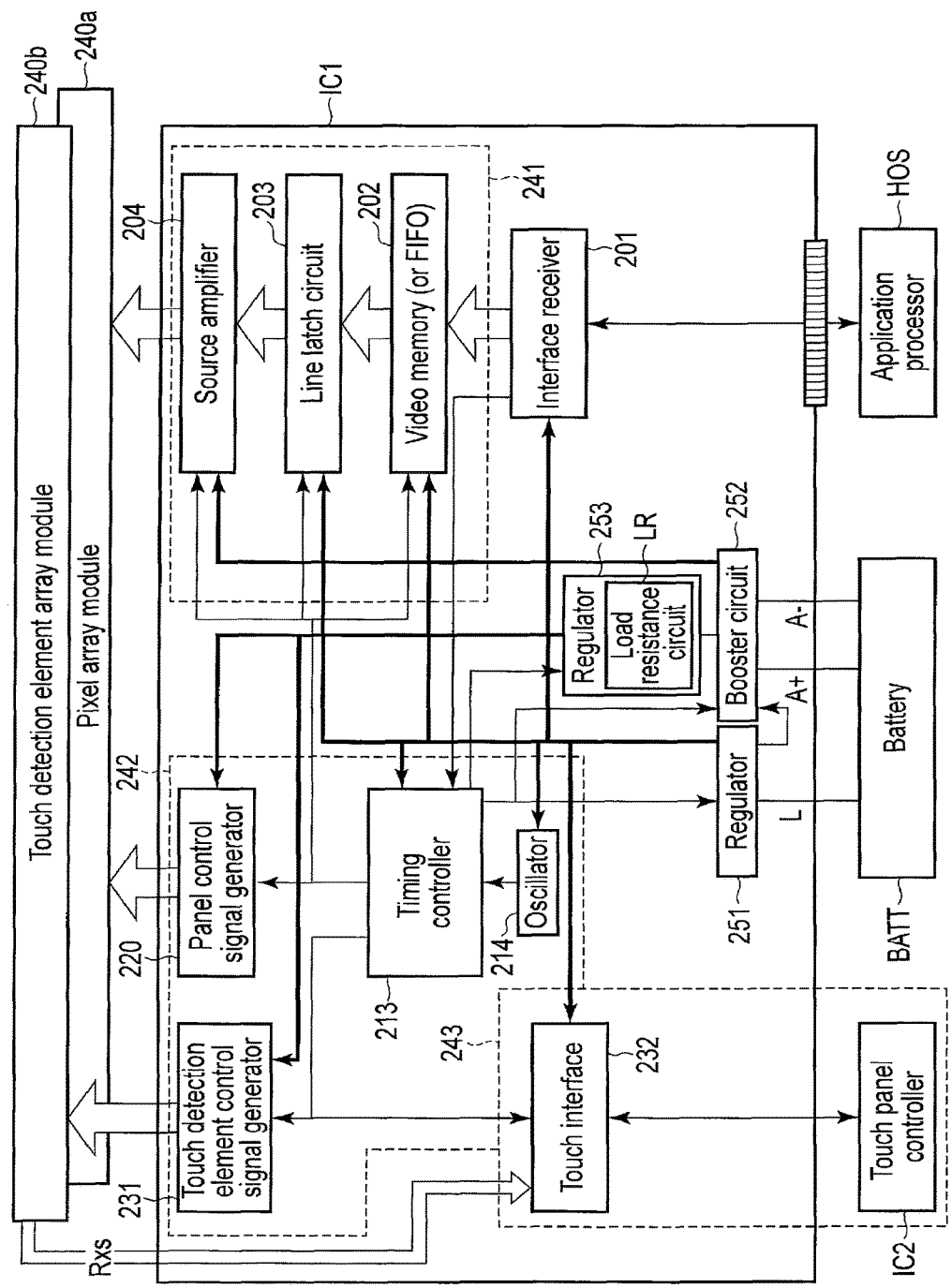
FIG. 6 is a block diagram showing an example of configuration in a liquid crystal driver IC1 of the embodiment.

In FIG. 6, video data from the application processor HOS is input to a video memory 202 via an interface receiver 201. The video data read from the video memory 202 is latched by a line latch circuit 203. The line latch circuit 203 can latch the video data of one line or a plurality of lines in the liquid crystal display panel LCD.

The video data corresponding to each pixel PX read from the line latch circuit 203 is digital-analog-converted by a source amplifier 204, and subjected to gamma correction by an amplifier to become a pixel signal. The pixel signal is written to each pixel PX arrayed in the pixel array module 240a of the liquid crystal display panel LCD. More specifically, the pixel signal is input to the pixels PX two-dimensionally arrayed in the display area DA via the source selection circuit MUP shown FIG. 2. Then, the pixel signal is written to the storage capacitor explained with reference to FIG. 4.

A set of blocks such as the video memory 202, the line latch circuit 203, and the source amplifier 204 may be called a video data processor 241.

Furthermore, the synchronization signal, the command and the like from the application processor HOS are taken by the interface receiver 201. The synchronization signal taken by the interface receiver 201 is input to the timing controller 213. In addition, the command taken via the interface receiver 201 is once input to a register (not shown) and interpreted, and its result is reflected on timing pulse generation of the timing controller 213, or the like. The interface receiver 201 converts an external clock rate of the digital data transmitted from the application processor HOS into an internal clock rate for the internal digital data. For example, a write operation of the interface receiver 201 is synchronous with the external clock, and a read operation of the interface receiver 201 is synchronous with the internal clock.

The timing controller 213 may be configured by a plurality of logic circuits and an application which controls the logic circuit, or by hardware including a logic circuit, a counter, and the like. The timing controller 213 can set the operation mode and the operation sequence of the liquid crystal driver IC1, and change the operation mode. Examples of the operation mode include the display period DWT including the write period in which the pixel signal is written to the pixel of each horizontal line, the touch detection period TDT (non-display period), and the like. For this reason, the timing controller 213 can refer to an external horizontal synchronization signal HSYNC from the interface receiver 201 and synchronize with the external horizontal synchronization signal HSYNC. The timing controller 213 generates various types of timing pulses to implement various types of operations, based on an internal clock from an oscillator 214.

Various types of timing pulses for display control that are output from the timing controller 213 are input to the video memory 202, the line latch circuit 203, the source amplifier 204 and a panel control signal generator 220. Furthermore, various types of timing pulses for sensor from the timing controller 213 are also input to a touch detection element control signal generator 231 and a touch interface 232.

The panel control signal generator 220 generates drive signals for the gate drive circuit GD and the common electrode drive circuit CD, and implements video display on the liquid crystal display panel LCD.

The touch detection element control signal generator 231 can supply the drive signals Tx1, Tx2, Tx3, . . . to the common electrodes C. When the drive signals are supplied to the common electrodes C, the detection signal Rxs of the contacted object can be obtained from the touch detection element Rx. The detection signal Rxs is input to the touch panel controller IC2. The touch panel controller 1C2 can determine the coordinate position of the finger, based on the drive timing of the common electrodes C (C1, C2, C3, . . . ) and the position of the touch detection element Rx which has output the lower-level detection signal Rxs output when the finger or the like is close to the touch detection element Rx. The touch panel controller 102 and the touch interface 232 are electrically connected with each other and have the operation timing synchronized with each other. In other words, the touch panel controller 102 can recognize the touch detection period TDT and receive the detection signal Rxs in the touch detection period TDT. The touch panel controller IC2 communicates with the touch detection element control signal generator 231 via the touch interface 232. And, the touch panel controller 102 recognizes the operation condition of the touch detection element control signal generator 231 (for example, the drive condition of the touch detection element and the like).

In the above-explained configuration, a set of blocks of the panel control signal generator 220, the touch detection element control signal generator 231, the timing controller 213, the oscillator 241, and the like may be called a scanning driver 242. The scanning driver 242 thus includes a second clock generator (oscillator 214) and can sequentially supply the pixel signal and the display drive signal to a plurality of display elements in time division, synchronously with a clock of the second clock generator, to execute display scanning. Furthermore, the scanning driver 242 supplies the drive signal for touch detection to the touch detection element.

In the above-explained configuration, a set of blocks of the touch interface 232, the touch panel controller IC2, and the like may be called a touch detector 243. The touch detector 243 can execute touch detection by sampling the detection signal Rxs from the touch detection element Rx. In other words, the coordinate position, i.e., the position on the display surface with which the user's finger or the pen is in touch can be calculated by the touch detector 243.

The liquid crystal driver IC1 includes regulators 251 and 253 and a booster circuit 252 which may be called a charge pump, as power supply modules for the internal circuits. As shown in FIG. 7($a$), for example, the regulator 251 receives the power supply from a battery BATT and generates the drive voltage by an output amplifier 251A for output stabilization. The regulator 251 can selectively take a plurality of (for example, two) potential voltages from the battery BATT. In other words, the regulator 251 includes a changeover switch 251B and an amplifier for output stabilization, and selects the input potential in response to the control signal, at the changeover switch 251B. The drive voltage output from the regulator 251 is supplied to the interface receiver 201, the video memory 202, the line latch circuit 203, the timing controller 213 and the oscillator 214. The booster circuit 252 is composed of, for example, a DC-DC converter. The booster circuit 252 receives the power supply from the regulator 251, boosts a direct-current voltage to a predetermined voltage by controlling a boost frequency, and outputs the voltage to the source amplifier as shown in FIG. 7($b$). In addition, the regulator 253 shown in FIG. 6 which receives the power supply from the booster circuit 252 generates a drive voltage, and outputs the drive voltage to the panel control signal generator 220 and the touch detection element control signal generator 231. Each of the circuit blocks in the liquid crystal driver IC1 thereby operates properly.

Next, a functional configuration of a load resistance circuit built in the display device of the present embodiment will be explained. In the above-explained in-cell display device with a touch panel function (i.e., the liquid crystal display device), load variation occurs cyclically since the panel drive load is varied in the display period and the non-display period (touch detection period). At this time, the booster circuit and the regulator for the liquid crystal drive cannot follow the load variation, and ripple may occur in the power supply for the liquid crystal drive. It is undesirable that the ripple has a risk of propagating the flexible printed-circuit board and vibrating the capacitor on the flexible wiring board or the vicinity to the capacitor. Thus, the load resistance circuit LR configured to reduce the ripple is provided in the regulator 253, in the display device of the present embodiment, as shown in FIG. 6.

FIG. 8 is a diagram showing an example of a circuit configuration of the load resistance circuit LR of the first embodiment. The load resistance circuit LR is a circuit which supplies load to a power supply voltage for liquid crystal drive output from an amplifier circuit Amp for output stabilization (i.e., an internal liquid crystal driver power supply). As shown in FIG. 8, the load resistance circuit LR includes a plurality of load resistances Z (Z1, Z2, Z3, . . . Zn), a plurality of first changeover switches SW1 (SW11, SW12, SW13, . . . SW1n) which switch connection/disconnection with the respective load resistances Z, and a second changeover switch SW2 which switches connection/disconnection with the amplifier circuit Amp. One of ends of each of the load resistances Z is connected to GND while the other end is connected to each of the first changeover switches SW1. It should be noted that at the panel inspection to execute individual inspection of each panel, for example, turning on/off each of the first changeover switches SW1 is set together with the panel inspection. Thus, the switch setting has been preliminarily completed before shipment of the display device. In other words, the first changeover switch SW1 which has been turned on before shipment remains turned on at any time, and the first changeover switch SW1 which has been turned off before shipment remains turned off at any time. In other words, the magnitude of the load which the load resistance circuit LR can supply to the power supply voltage for liquid crystal drive is preset before shipment. In the example shown in FIG. 8, the plurality of load resistances Z, the plurality of first changeover switches SW1, the amplifier circuit Amp, and the second changeover switch SW2 are provided in the liquid crystal driver IC1. However, the configuration is not limited to the embodiment, but they may be provided outside the liquid crystal driver IC1. They may be provided outside the liquid crystal driver IC1, too, in an embodiment of FIG. 13 to be explained later.

Each of the first changeover switches SW1 is connected to the second changeover switch SW2. Turing on/off the second changeover switch SW2 is controlled by the timing controller 213. If the second changeover switch SW2 is turned on, the amplifier circuit Amp and the load resistance circuit LR are in a connected state. If the second changeover switch SW2 is turned off, the amplifier circuit Amp and the load resistance circuit LR are in a disconnected state.

When the amplifier circuit Amp connected to the load resistance circuit LR is provided with the power supply from the booster circuit 252, the amplifier circuit Amp generates the drive voltage for output stabilization. The drive voltage output from the amplifier circuit Amp is supplied to the panel control signal generator 220, a capacitor CFPC provided on the flexible printed-circuit board FPC1, and the like.

Next, an operation of the load resistance circuit LR configured as explained above will be explained with reference to a timing chart of FIG. 9.

Figure 9:
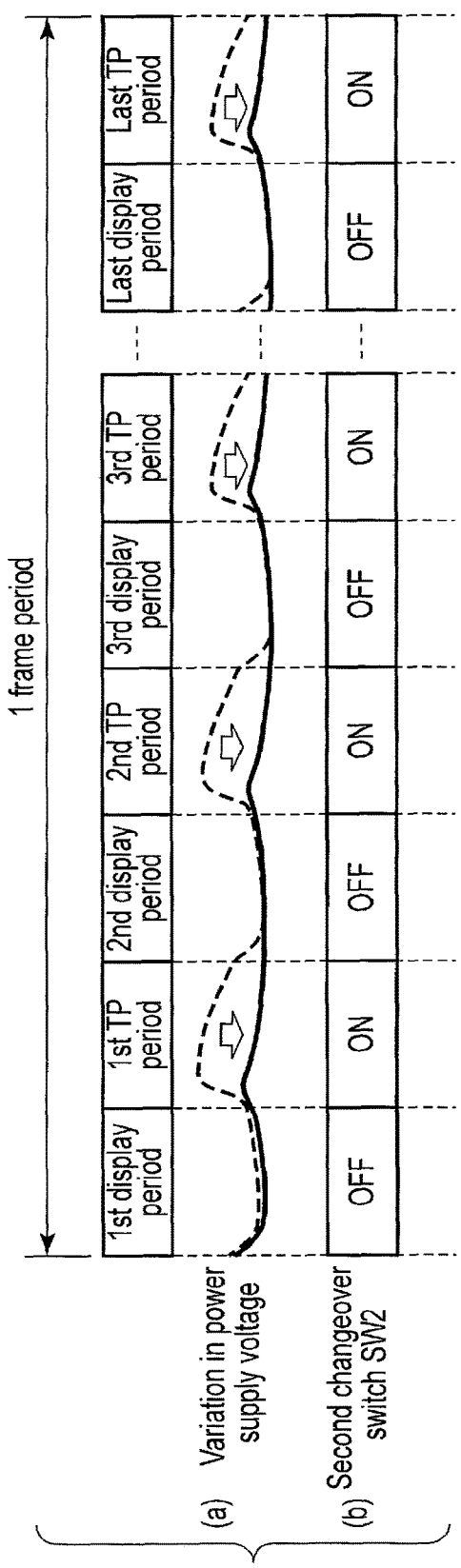
FIG. 9 is a timing chart showing an example of an operation of the load resistance circuit LR shown in FIG. 8.

FIG. 9 shows a timing chart indicating a relationship between variation in the power supply voltage for liquid crystal drive in the display period and the non-display period (TP period) and turning on/off of the second changeover switch SW2. In FIG. 9(a), a broken line presents the variation in the power supply voltage at a general display device (i.e., a display device including no load resistance circuit LR). In FIG. 9(a), a solid line presents the variation in the power supply voltage at the display device of the present embodiment (i.e., a display device including the load resistance circuit LR).

As indicated by the broken line in FIG. 9(a), the panel drive load is varied in the display period and the non-display period (more specifically, the panel drive load in the non-display period is smaller than that in the display period) in the general display device including no load resistance circuit LR. For this reason, the ripple occurs in the power supply voltage for liquid crystal drive output from the amplifier circuit Amp, in the non-display period.

In contrast, in the display device of the present embodiment, turning on/off of second changeover switch SW2 in the load resistance circuit LR is switched at the change between the display period and the non-display period, as shown in FIG. 9(b). More specifically, the second changeover switch SW2 is switched from off to on when the display period is changed to the non-display period, and the second changeover switch SW2 is switched from on to off when the non-display period is changed to the display period. When the second changeover switch SW2 is switched to be on, the load provided at the load resistance circuit LR is supplied to the power supply voltage for liquid crystal drive. This is because the power supply line on the output side (output line) of the amplifier circuit Amp and the load resistance circuit LR are in the connected state as explained above. The power supply voltage for liquid crystal drive thereby drops. In other words, occurrence of the ripple in the non-display period is suppressed as indicated by the solid line in FIG. 9(a). Subsequently, vibration at the capacitor CFPC on the flexible printed-circuit board FPC1 or the vicinity to the capacity CFPC, which results from the ripple, is suppressed.

According to the first embodiment, as explained above, since the display device includes the load resistance circuit LR connected to the power supply for liquid crystal drive in the non-display period, occurrence of the ripple at the power supply voltage due to the cyclic load variation in display/non-display is suppressed.

Second Embodiment

Next, a second embodiment will be explained. In the second embodiment, unlike the first embodiment, a ripple amount detection circuit RD is further provided in a load resistance circuit LR. Constituent elements and operations different from those of the first embodiment will be hereinafter explained chiefly.

FIG. 10 is a diagram showing an example of a circuit configuration of the load resistance circuit LR of the second embodiment. As shown in FIG. 10, the load resistance circuit LR includes not only a plurality of load resistances Z, a plurality of first changeover switches SW1, and a second changeover switch SW2, which have been explained in the first embodiment, but also a ripple amount detection circuit RD which detects the amount of ripple occurring at the power supply for liquid crystal drive (ripple amount). Unlike the first embodiment, the first changeover switches SW1 are not preliminarily switched before shipment of the display device, but controlled and switched by the ripple amount detection circuit RD.

The ripple amount detection circuit RD is connected to a power supply line on an output side of an amplifier circuit Amp. In FIG. 10, the ripple amount detection circuit RD is connected more closely to a position on a flexible wiring board FPC1 side than the second changeover switch SW2 side, but may be connected more closely to a position on the amplifier Amp side than the second changeover switch SW2 side. The ripple amount detection circuit RD has a function of detecting the ripple amount occurring at the power supply voltage for liquid crystal drive and a function of controlling turning on/off the first changeover switches SW1 in response to the detected ripple amount.

Figure 12:
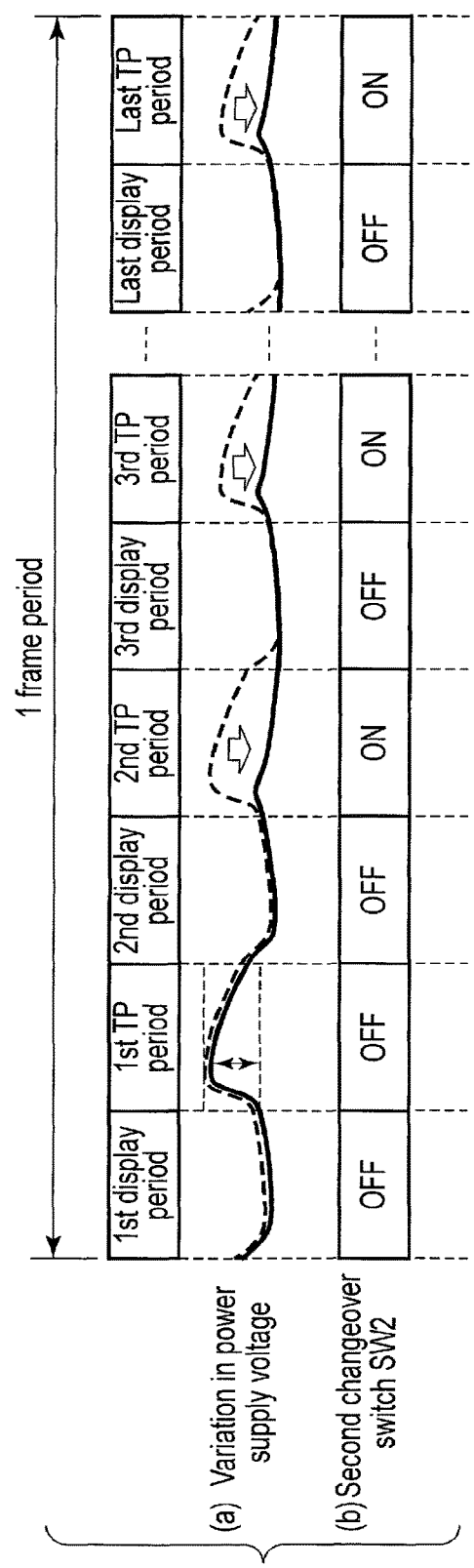
FIG. 12 is a timing chart showing an example of an operation of the load resistance circuit LR shown in FIG. 10.

Operations of the load resistance circuit LR of the second embodiment will be explained with reference to a flowchart of FIG. 11 and a timing chart of FIG. 12. In FIG. 12(a), a broken line presents a variation in power supply voltage at a general display device (i.e., a display device including no load resistance circuit LR). In FIG. 12(a), a solid line presents a variation in power supply voltage at the display device of the present embodiment (i.e., a display device including the load resistance circuit LR).

First, if a frame period starts (step S1), the ripple amount detection circuit RD detects the amount of the ripple occurring at the power supply voltage in an initial non-display period (1st TP period in FIG. 12) (step S2). More specifically, the ripple amount detection circuit RD monitors the variation in the power supply voltage for liquid crystal drive. The ripple amount detection circuit RD samples analog data indicating the variation in the power supply voltage at regular sampling intervals and digitizes the analog data. The amount of the ripple occurring at the power supply voltage is thereby detected.

Then, the ripple amount detection circuit RD controls turning on/off a plurality of first changeover switches SW1 by referring to the switch change pattern information stored in memory M1. In other words, the ripple amount detection circuit RD selects a load resistance which is to supply load to the most appropriate power supply voltage for the detected ripple, of a plurality of load resistances (step S3). The switch change pattern information indicates information in which the ripple amount is associated with combination of turning on/off a plurality of first changeover switches SW1, for example, information prepared at shipment. In other words, the ripple amount detection circuit RD can recognize combination of the load resistances Z which can supply preferable load to suppress the detected ripple amount, by referring to the switch change pattern information. Control of turning on/off the first changeover switches SW1 can be thereby executed preferably.

Next, turning on/off the second changeover switch SW2 is controlled under an instruction from a timing controller 213 (step S4). More specifically, the second changeover switch SW2 is switched to be on from off in each of the second and subsequent non-display periods (2nd TP period to Last TP period) as shown in FIG. 12(b). After that, if the frame period is ended (i.e., the period is ended up to Last TP period) (step S5), the flow returns to step S1 and the above-explained processing is repeated in a next frame period. The ripple (see the broken line in FIG. 12(a)) occurring in the second and subsequent non-display periods is thereby suppressed as indicated by the solid line in FIG. 12(a).

According to the above-explained second embodiment, the display device further includes the ripple amount detection circuit RD which detects the amount of the ripple occurring in the initial non-display period in one frame period and which executes selection of the load resistance (i.e., control of turning on/off the first changeover switches SW1) in response to the detected ripple amount. To suppress the ripple occurring at the power supply voltage, finer adjustment (tuning) is thereby executed.

Third Embodiment

Next, a third embodiment will be explained. In the third embodiment, unlike the first and second embodiments, a ripple control circuit RC is further provided in a load resistance circuit LR. Constituent elements and operations different from those of the first and second embodiments will be hereinafter explained chiefly.

FIG. 13 is a diagram showing an example of a circuit configuration of the load resistance circuit LR of the third embodiment. As shown in FIG. 13, the load resistance circuit LR includes not only a plurality of load resistances Z, a plurality of first changeover switches SW1, a second changeover switch SW2, and a ripple amount detection circuit RD, which have been explained in the second embodiment, but also a ripple control circuit RC. The ripple control circuit RC controls the ripple amount detection circuit RD in accordance with the variation in bundle number of common electrodes C.

Figure 14:
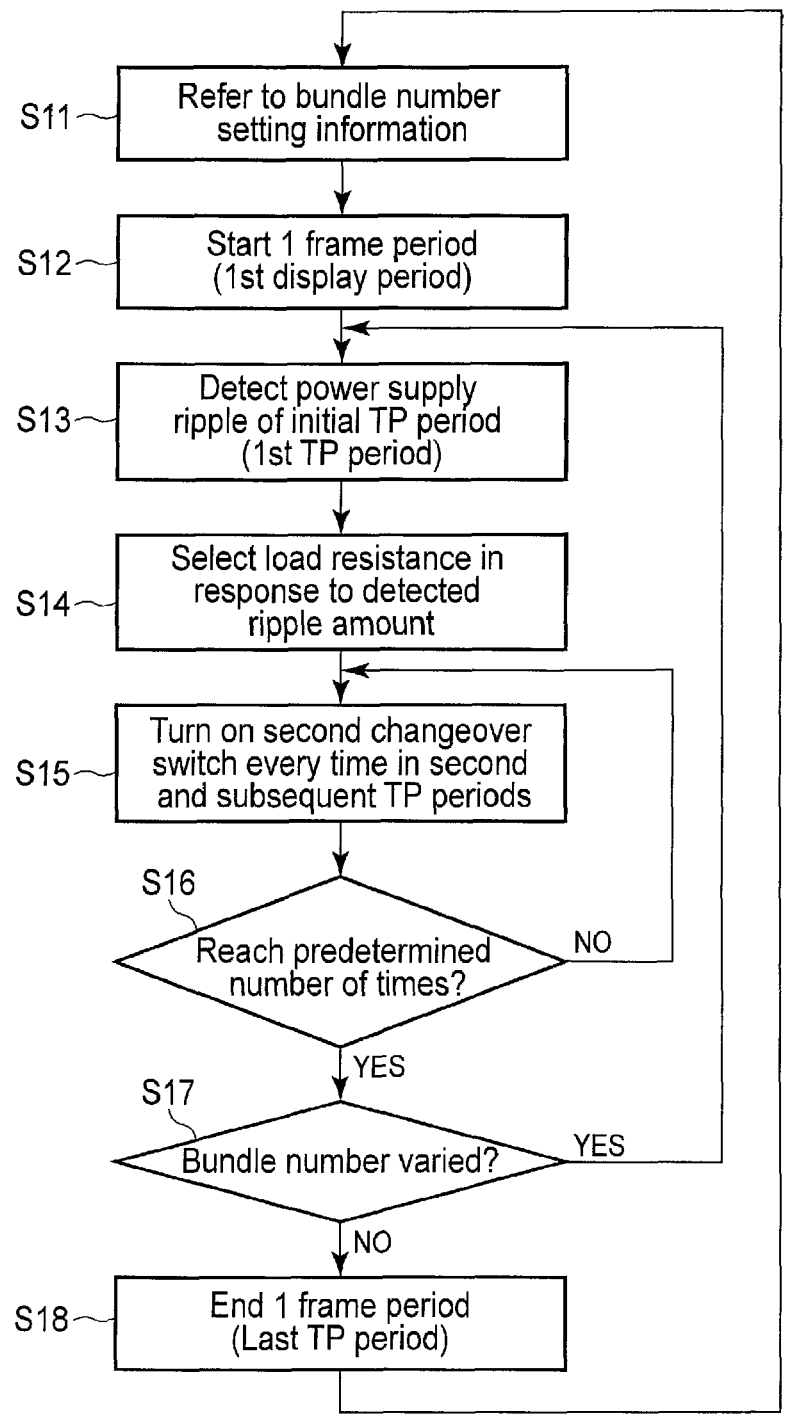
FIG. 14 is a flowchart showing an example of an operation of the load resistance circuit LR shown in FIG. 13.

Operations of the load resistance circuit LR of the third embodiment will be explained with reference to a flowchart of FIG. 14 and a timing chart of FIG. 15. In FIG. 15(a), a broken line presents a variation in power supply voltage at a general display device (i.e., a display device including no load resistance circuit LR). In FIG. 15(a), a solid line presents a variation in power supply voltage at the display device of the present embodiment (i.e., a display device including the load resistance circuit LR).

First, the ripple control circuit RC refers to bundle number setting information stored in a memory (not shown) (step S11). The ripple control circuit RC can thereby recognize whether the bundle number of the common electrodes C is varied before one frame period is started or not. Variation in bundle number of the common electrodes C indicates a condition that, for example, the bundle number of the common electrodes C1 to Cm (where m is smaller than n), of the common electrodes C1 to Cn, is 2 (i.e., every two common electrodes C are bundled) but the bundle number of the common electrodes Cm+1 to Cn is 4 (i.e., every four common electrodes C are bundled). If it is recognized by the ripple control circuit RC that the bundle number of the common electrodes C is not varied, the subsequent processing is the same as that of the second embodiment and detailed explanations are omitted. Processing in a case where it is recognized by the ripple control circuit RC that the bundle number of the common electrodes C is varied, will be hereinafter explained. If the ripple control circuit RC recognizes that the bundle number of the common electrodes C is varied, the ripple control circuit RC confirms how many non-display periods have come before the bundle number is varied, by bundle number setting information. And, the ripple control circuit RC executes processing of counting the number of times of the non-display periods every time the non-display period comes.

If the frame period starts (step S12), the ripple amount detection circuit RD detects the amount of the ripple occurring at the power supply voltage in an initial non-display period (for example, 1st TP period in bundle number n period in FIG. 15) (step S13). Next, the ripple amount detection circuit RD controls turning on/off a plurality of first changeover switches SW1 by referring to the switch change pattern information stored in a memory (not shown) (i.e., selects a load resistance which is to supply load to the power supply voltage) (step S14).

Figure 15:
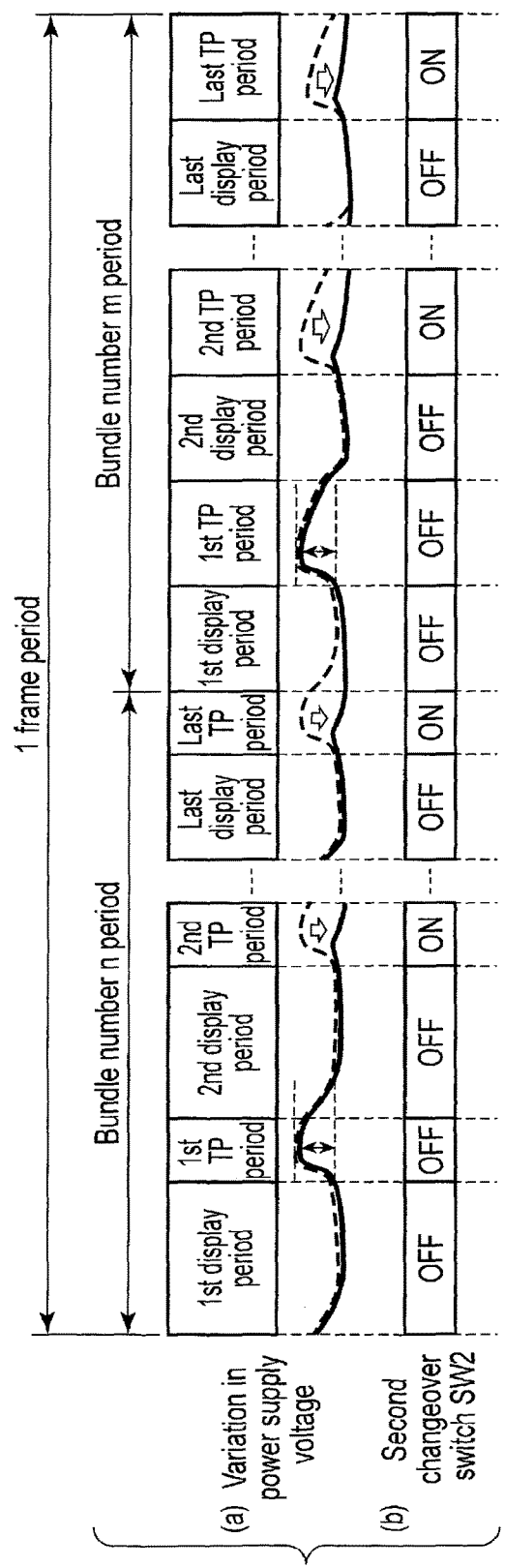
FIG. 15 is a timing chart showing an example of an operation of the load resistance circuit LR shown in FIG. 13.

Subsequently, the second changeover switch SW2 is switched from off to on in a next non-display period (for example, 2nd TP period in bundle number n period in FIG. 15), as shown in FIG. 15(b), under an instruction from the timing controller 213 (step S15).

Next, the ripple control circuit RC determines whether the non-display period which is considered to come before the bundle number is varied, has come or not, based on the number of the counted non-display periods (i.e., whether the number of the counted non-display periods has reached the predetermined number) (step S16). If it is determined that the number of the counted non-display periods has not reached the predetermined number (NO in step S16), the flow returns to the above-explained processing in step S15.

Then, the second changeover switch SW2 is switched again from off to on in the next non-display period (for example, Last TP period in bundle number n period in FIG. 15), as shown in FIG. 15(b).

In contrast, if it is determined that the number of the counted non-display periods has reached the predetermined number (YES in step S16), the ripple control circuit RC determines whether the bundle number is still varied in one frame period or not (step S17). If it is determined that the bundle number is still varied (YES in step S17), the ripple control circuit RC controls the ripple amount detection circuit RD to execute the processing in steps S13 to S15 in the next bundle number period (for example, the bundle number m period in FIG. 15).

In contrast, if it is determined that the bundle number is not varied any more (NO in step S17), the frame period is ended (step S18). If the frame period is ended, the flow returns to step S11 and the above-explained processing is repeated in a next frame period. The ripple (see the broken line in FIG. 15(a)) occurring in the second and subsequent non-display periods in periods n and m can be thereby suppressed as indicated by the solid line in FIG. 15(a), even if the bundle number of the common electrodes C is varied.

According to the third embodiment, as explained above, since the display device further includes the ripple control circuit RC which controls the ripple amount detection circuit RD in accordance with the variation in bundle number of the common electrodes C, the ripple occurring at the power supply voltage can be preferably suppressed even if the bundle number of the common electrodes C is varied.

According to the third embodiment, explanations are focused on the case where the bundle number of the common electrodes C is varied but, the ripple occurring at the power supply voltage can be preferably suppressed even if the touch frequency is varied by the configuration explained in the third embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device, comprising:
a display configured to display an image; and
a driver configured to execute driving for displaying the image on the display in a display period to display the image, and execute driving different from the driving for displaying the image on the display, in a non-display period subsequent to the display period,
the driver comprising:
a power supply module configured to supply a power supply voltage to an internal circuit included in the driver,
the power supply module comprising:
a load module configured to form a load to the power supply voltage supplied to the internal circuit; and
a first switch configured to make connection between an output line and the load module, the output line connecting the power supply module and the internal circuit,
the driver executing control of making connection between the output line and the load module in the non-display period.

2. The display device of claim 1, wherein
the load module comprises a plurality of load resistances, and a plurality of second switches connected to the plurality of load resistances, respectively, and
the driver executes control of switching the second switches connected to the plurality of load resistances, respectively, to adjust magnitude of load supplied to the power supply voltage in the non-display period.

3. The display device of claim 2, wherein
the driver executes control of detecting a ripple occurring in the power supply voltage in an initial non-display period, and switching each of the second switches connected to the plurality of load resistances, respectively, so as to supply a preferable load to the power supply voltage to suppress the detected ripple after the initial non-display period.

4. The display device of claim 2, wherein
the driver, if magnitude of a ripple occurring in the power supply voltage in a plurality of first non-display periods included in a first period is different from magnitude of the ripple occurring in the power supply voltage in a plurality of second non-display periods included in a second period, executes first control of detecting a first ripple occurring in the power supply voltage in an initial first non-display period, and switching each of the second switches connected to the plurality of load resistances, respectively, so as to supply a preferable load to suppress the detected first ripple after the initial first non-display period, and
the driver, if the first period is ended and the second period is started, executes second control of detecting a second ripple occurring in the power supply voltage in an initial second non-display period, and switching each of the second switches connected to the plurality of load resistances, respectively, so as to supply a preferable load to suppress the detected second ripple after the initial second non-display period.

5. The display device of claim 4, wherein
the driver, every time one of the plurality of first non-display periods included in the first period is started, counts number of times of start of the first non-display period, and
the driver, if the counted number of times reaches a preset number of times, recognizes that the first period has been ended and executes the second control.

6. The display device of claim 4, wherein
the driver, if one frame period including the first period and the second period is ended, executes the first control and the second control for a new first period and a new second period included in a next frame period.

7. The display device of claim 4, wherein
each of the non-display periods is a sensing operation period of a touch sensor provided at the display, and
the plurality of first non-display periods and the plurality of second non-display periods are different with respect to width of an area which can be sensed by the touch sensor.

8. The display device of claim 1, wherein
the non-display period is a sensing operation period of a touch sensor provided at the display.

9. A control method applied to a display device comprising a display which displays an image, and a driver, the driver including a power supply module configured to supply a power supply voltage to an internal circuit included in the driver, the power supply module comprising a load module configured to form a load to the power supply voltage supplied to the internal circuit, and a first switch configured to make connection between an output line and the load module, the output line connecting the power supply module and the internal circuit, the method comprising:

executing driving for displaying the image on the display in a display period to display the image, and executing driving different from the driving for displaying the image on the display, in a non-display period subsequent to the display period; and executing control of making connection between the output line and the load module in the non-display period.

10. The control method of claim 9, wherein the load module comprises a plurality of load resistances, and a plurality of second switches connected to the plurality of load resistances, respectively, and the method further comprises executing control of switching each of the second switches connected to the plurality of load resistances, respectively, to adjust magnitude of load supplied to the power supply voltage in the non-display period.

* * * * *